Oct. 21, 1941.　　B. R. BENJAMIN　　2,259,874
AGRICULTURAL IMPLEMENT
Filed Sept. 14, 1940
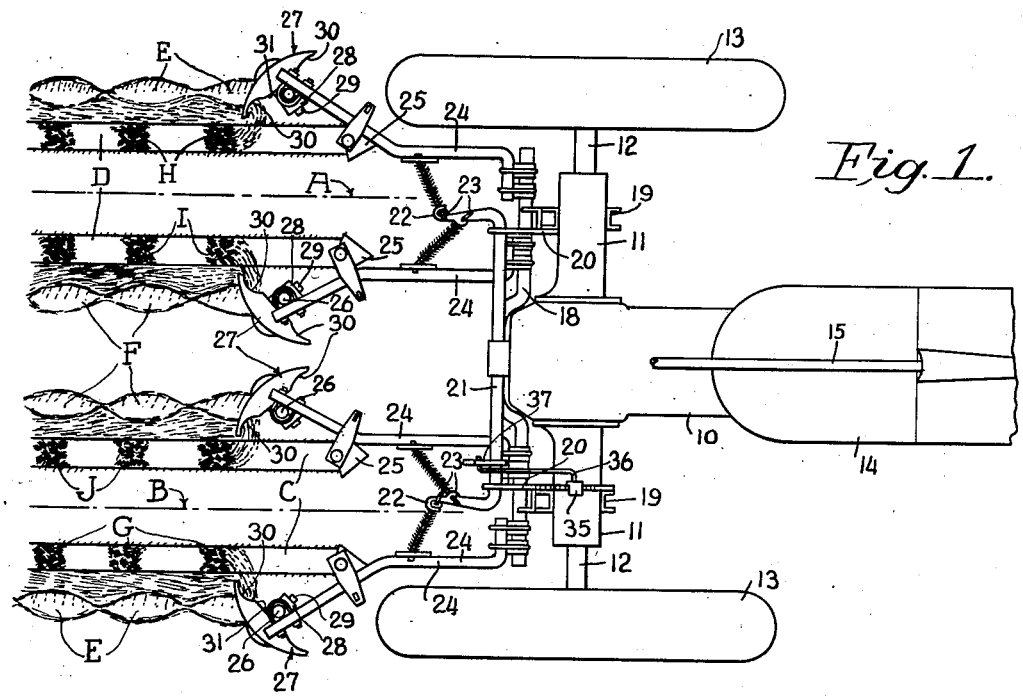
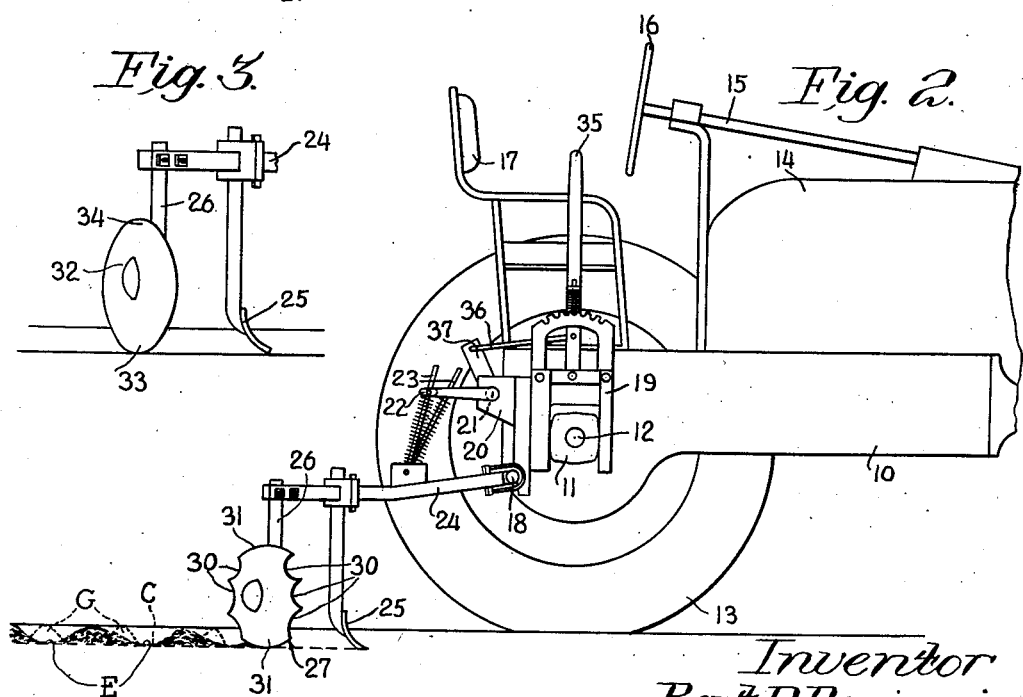
Inventor
Bert R. Benjamin
By Paul O Pippel
Atty Patented Oct. 21, 1941

2,259,874

UNITED STATES PATENT OFFICE 2,259,874

AGRICULTURAL IMPLEMENT

Bert R. Benjamin, Oak Park, Ill., assignor to International Harvester Company, a corporation of New Jersey Application September 14, 1940, Serial No. 356,821

15 Claims. (Cl. 97—47)

This invention relates to an agricultural implement. More particularly the invention relates to an implement of the type adapted to treat soil for the purposes of conserving moisture and eliminating soil erosion.

Numerous devices have been heretofore produced and marketed which provide for the general treatment of a field for the purposes mentioned above. While those devices have proved satisfactory in the general instances to which they are applicable, certain specific problems arise in connection with the use of additional implements over the field after the field has been treated. One such instance occurs when a field is cultivated after it has been planted. The usual type of cultivator is either a horse-drawn cultivator carried on wheels or a tractor-mounted cultivator. In either case, the wheels of the tractor or cultivator leave continuous paths through the field. In addition, the cultivator shovels form furrows generally paralleling the wheel tracks. Since these furrows and tracks are continuous, they eventually serve as continuous troughs along which moisture may run uninterruptedly. It will be seen, therefore, that in the event of the field containing any inclines, moisture will drain off instead of being confined.

It is an important object of this invention to provide means for damming the furrows formed by a ground-working tool such as a cultivator.

It is also an important object to provide means for forming basins in the tracks of the wheels on the vehicle or the like that carries the cultivator.

A further important object of the invention is to provide means for forming basins in the wheel tracks by cutting out soil portions therefrom and and depositing that soil at intervals in the furrows formed by the ground-working tools.

Other objects and features of the invention will become apparent as the disclosure is more fully made.

In the drawing:

Figure 1 is a plan view of the rear portion of a tractor-mounted cultivator showing the ground-working means associated therewith;

Figure 2 is a side elevational view of the same structure; and,

Figure 3 is an enlarged view showing the relationship between a cultivator shovel and a modified form of basin-forming or damming tool.

The particular embodiment of the invention chosen for purposes of illustration includes a tractor-mounted cultivator in which a tractor of the ordinary type is provided with an attached cultivating unit. Only the rear portion of such tractor is shown in the drawing, the reference character 10 designating the frame or body of the tractor. The rear portion of the tractor is provided with opposite, laterally extending axle housings 11, respectively carrying axles 12, which in turn are respectively connected to ground supports in the form of drive wheels 13. The intermediate portion of the tractor consists of the usual hood and fuel tank structure 14, above which is located a steering rod 15 including a steering wheel 16 for steering the tractor front wheels, not shown. An operator's station 17 is located rearwardly of the steering wheel.

The particular type of cultivating attachment chosen for the purpose of illustration includes a transverse rockable member 18 carried by a pair of spaced brackets 19 respectively secured to the axle housings 11. The upper portion of each bracket 19 includes a rearwardly extending member 20. These members serve to journal a transverse rock-shaft 21 having rearwardly extending arms 22 connected by pressure rods 23 to rearwardly extending cultivating beams 24 carried by the transverse rockable member 18. As shown in Figure 1, the cultivator attachment includes four beams 24 and the cultivator is adapted to cultivate two rows, the center lines of which are generally designated by the reference characters A and B.

Each beam 24 carries a cultivator shovel 25. The two shovels 25 at the right-hand side of the tractor are adapted to cultivate alongside the row B, and in operation form the parallel furrows C. The two shovels 25 in the left-hand pair similarly cultivate alongside the row A and form the parallel furrows D.

As best shown in Figure 1, each of the beams 24 is bent laterally at its rearward end and is provided with a vertical standard 26 journaling a rotatable basin-forming means in the form of a disk 27. Each standard 26 includes at its lower end a bearing portion 28 journaling a shaft 29 on which the disk 27 is carried. It will be noted that the axis of rotation of the shaft 29 is disposed at an angle to a vertical plane passed through one of the furrows C. It will be noted further that the two outermost disks 27 are adapted to operate respectively in the tracks formed by the tractor wheels 13.

As shown in Figures 1 and 2, each of the disks 27 is notched or cut away, as at 30, to provide lesser or smaller soil-engaging portions, while other portions of the disk remain intact to form greater or larger soil-engaging portions 31. As the disk rotates and cuts the soil, it consequently engages alternately larger and smaller portions of the soil, thus forming a row of basins or pits E. Those disks disposed at the inner part of the unit may be identical and form respectively rows of basins F. Since the axis of rotation of each disk is inclined to a vertical plane passed through a furrow, the concave surface of the disk is likewise at an angle to the furrow, and consequently, as the basins are formed, the soil cut out is deflected or deposited generally laterally of the disk. Looking now to the right-hand arrangement of the unit, it will be seen that the disk 27 operating in the track of the right-hand wheel 13 forms the basins E and deposits soil into the adjacent furrow C, thus forming at intervals a plurality of mounds or dams G. The disk behind the left-hand wheel 13 operates similarly to form dams H in the adjacent furrow D. The operation of the innermost disks is identical and the innermost furrows C and D likewise are dammed, as at I and J.

The modified form of disk shown in Figure 3 is of the type disclosed and claimed in applicant's Patent No. 2,136,607 issued November 15, 1938. This disk is indicated by the numeral 32. The disk is continuous, but is eccentrically mounted on the standard 26; that is to say, the axis of rotation of the disk is spaced radially from the true center of the disk, so that the disk is in effect provided with diametrically opposite greater and lesser soil-engaging portions 33 and 34, respectively. The operation of this disk is substantially similar to that of the disks 27. As the disk 32 rotates, the eccentric mounting thereof causes gradually greater, then lesser, portions thereof to engage the soil. Since the disk is arranged at an angle to a vertical plane passed through a furrow, the basin formed thereby becomes gradually wider and narrower, so that the basins formed by this disk will be in appearance substantially the same as those formed by the disks 27. The cultivator unit is provided with a suitable lifting means in the form of a hand lever 35 pivoted on the tractor and connected by a rod 36 with an upstanding arm 37 rigidly carried on the transverse rock-shaft 21. This lever 35 is operable to lift the shovels and basins from the ground.

It will be seen from the foregoing description of the construction and operation of the earth-working means that the continuous furrows and tracks formed by the shovels and wheels are provided with dams and basins, so that continuity thereof is interrupted at intervals. This provision eliminates substantial problems of moisture conservation and soil erosion inasmuch as continuous flow of moisture along these paths, tracks, or furrows is prevented. There is likewise prevented the possibility of soil blowing along these tracks or furrows. It will be noted also that the innermost disks 27 which form the pits or basins F operate along substantially the longitudinal center line of the tractor, so that, if the tractor should be of the tricycle type having a single wheel or a pair of closely spaced wheels at the front end thereof, pits or basins F would lie substantially within the path or paths formed by such wheels.

It will be understood, of course, that the illustrations and description herein set forth were of a preferred embodiment of the invention and that numerous modifications and alterations may be made therein without departing from the spirit and scope of the invention as defined in the appended claims.

What is claimed is:

1. In combination, a frame including a ground support, a ground-working tool spaced laterally of the ground support, and a basin-forming means carried by the frame rearwardly of the ground support for forming spaced basins in the path of the ground support and adapted to deposit soil from the basins formed thereby into the path formed by the ground-working tool.

2. In combination, a frame including a ground support, a ground-working tool spaced laterally of the ground support, and a basin-forming means carried by the frame rearwardly of the ground support for forming spaced basins in the path of the ground support, said means including an element having a surface inclined to the path of travel of the ground support and adapted to deflect soil cut out from the basins into the path formed by the ground-working tool.

3. In combination, a cultivator element adapted to form a furrow, and a basin-forming means disposed laterally of and adjacent the element for forming spaced basins at one side of the furrow, said means including an element having a surface inclined to the furrow and adapted to deflect soil cut out from the basins into the furrow.

4. In combination, a cultivator element adapted to form a furrow, and a basin-forming means disposed laterally of and adjacent the element for forming spaced basins at one side of the furrow, said means including a rotatable soil-engaging disk eccentrically mounted on an axis of rotation inclined to a vertical plane through the furrow.

5. In combination, a cultivator element adapted to form a furrow, and a basin-forming means disposed laterally of and adjacent the element for forming spaced basins at one side of the furrow, said means including a rotatable soil-engaging disk mounted on an axis of rotation inclined to a vertical plane through the furrow, said disk having portions thereof cut away to provide a lesser soil-engaging portion.

6. In combination, a cultivator element adapted to form a furrow, and a basin-forming means disposed laterally of and adjacent the element for forming spaced basins at one side of the furrow, said means including a rotatable soil-engaging disk mounted on an axis of rotation inclined to a vertical plane through the furrow, said disk having alternate larger and smaller soil-engaging portions.

7. In combination, a frame including a ground support, a ground-working tool spaced laterally of the ground support, and a basin-forming means carried by the frame rearwardly of the ground support for forming spaced basins in the path of the ground support, said means including a rotatable soil-engaging disk eccentrically mounted on an axis of rotation inclined to a vertical plane through the furrow.

8. In combination, a frame including a ground support, a ground-working tool spaced laterally of the ground support, and a basin-forming means carried by the frame rearwardly of the ground support for forming spaced basins in the path of the ground support, said means including a rotatable soil-engaging disk mounted on an axis of rotation inclined to a vertical plane through the furrow, said disk having portions thereof cut away to provide a lesser soil-engaging portion.

9. In combination, a frame including a ground support, a ground-working tool spaced laterally of the ground support, and a basin-forming means carried by the frame rearwardly of the ground support for forming spaced basins in the path of the ground support, said means including a rotatable soil-engaging disk mounted on an axis of rotation inclined to a vertical plane through the furrow, said disk having alternate larger and smaller soil-engaging portions.

10. In combination, a frame including a ground wheel, a support carried by the frame and including a cultivator shovel disposed laterally and rearwardly of the ground wheel, and a basin-forming means carried by the support, said means including a rotatable element disposed rearwardly of and in the path of the ground wheel and having alternate greater and lesser soil-engaging portions adapted to cut the soil at intervals behind said wheel, said element being inclined to a vertical plane through the wheel and adapted at intervals to throw soil cut out of the basins into the furrow formed by the cultivator shovel.

11. In combination, a tractor, cultivator rigs movably connected to the tractor, cultivating tools carried by the cultivator rigs, means for moving the cultivating tools of the cultivator rigs into and out of engagement with the ground, and basin-forming means carried by the cultivator rigs rearwardly of the cultivating tools and adapted to form basins in the soil when the cultivating tools are in a ground-engaging position.

12. In combination, a tractor, cultivator rigs pivotally mounted on the tractor, cultivating tools mounted on the cultivator rigs, means for moving the cultivating tools of the cultivator rigs into and out of engagement with the ground, and basin-forming means carried by the cultivator rigs rearwardly of the cultivating tools and adapted to form basins in the soil when the cultivating tools are in a ground-engaging position.

13. In combination, a tractor, cultivator rigs pivotally mounted on the tractor, cultivating tools carried by the cultivator rigs, means for moving the cultivating tools of the cultivator rigs into and out of engagement with the ground, and basin-forming means comprising a rotatable soil-engaging disk eccentrically mounted and carried by the cultivator rigs for forming basins in the soil when the cultivating tools are in a ground-engaging position.

14. In combination, a tractor, cultivator rigs movably mounted on the tractor and having cultivating shovels mounted thereon, means for moving the cultivator rigs into and out of engagement with the ground, and basin-forming means carried by the cultivator rigs rearwardly of the cultivator shovels and adapted to move portions of the ground into the path left by the cultivating shovel when the cultivator rig is in an operating position.

15. In combination, a tractor, cultivator rigs movably connected to the tractor, brackets carried by the rigs, cultivating tools secured to the rigs by the brackets, and a basin-forming means adapted to be secured to the rigs by one of its brackets upon removal of one of the cultivating tools.

BERT R. BENJAMIN.